US006825883B1

(12) United States Patent
Hata

(10) Patent No.: US 6,825,883 B1
(45) Date of Patent: Nov. 30, 2004

(54) AUTO-FOCUS APPARATUS BASED ON PIXEL RESOLUTION AND CONTROL METHOD FOR THE SAME

(75) Inventor: Daisuke Hata, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/365,863

(22) Filed: Aug. 3, 1999

(30) Foreign Application Priority Data

Aug. 4, 1998 (JP) .......................................... 10-220554

(51) Int. Cl.[7] ............................................... H04N 5/232
(52) U.S. Cl. ...................................................... 348/345
(58) Field of Search ................................ 348/345, 349, 348/346, 354, 355, 356

(56) References Cited

U.S. PATENT DOCUMENTS 6,005,612 A * 12/1999 Kikuchi et al. ............. 348/354
6,342,922 B1 * 1/2002 Mizoguchi .................. 348/355
6,373,524 B2 * 4/2002 Suda et al. ................. 348/345
6,449,013 B1 * 9/2002 Suzuki et al. ............... 348/279
6,512,549 B1 * 1/2003 Iijima et al. ................ 348/349

FOREIGN PATENT DOCUMENTS

| | | |
|---|---|---|
| DE | 40 23 417 | 2/1991 |
| EP | 0 421 243 | 4/1991 |
| EP | 0 605 240 | 7/1994 |
| EP | 0 720 360 | 7/1996 |
| JP | 61-262382 | 11/1986 |
| JP | 64-59311 | 3/1989 |
| JP | 64-77008 | 3/1989 |
| JP | 1-187521 | 7/1989 |
| JP | 1-287512 | 11/1989 |
| JP | 4-130408 | 5/1992 |
| JP | 4-145404 | 5/1992 |

* cited by examiner

*Primary Examiner*—Tuan Ho
*Assistant Examiner*—Rashawn N Tillery
(74) *Attorney, Agent, or Firm*—Oblon, Spivak, McClelland, Maier & Neustadt, P.C.

(57) ABSTRACT

In the auto-focus apparatus, a CPU controls an amount of shift of a focus lens system for each sampling when an AF evaluated value is sampled so that the amount of shift is changed according to a number of recording pixels in a CCD. Therefore, even if a CCD having a large number of pixels is utilized the apparatus can perform auto-focusing within a short time.

12 Claims, 13 Drawing Sheets

100
PC CARD
150
112
MCC
110
CODER
109
DCT
108
IPP
107
DRAM
111
A/D
106
AGC AMP-LIFIER
105
CDS
104
CCD
103
102
BUS
DISPLAY SECTION
122
OPERATING SECTION
123
CPU
121
EEPROM
130
SG
126
BATTERY
128
DC-DC CONVERTER
129
STROBE
127
MOTOR DRIVER
135
ZOOM DRIVER
133
FOCUS DRIVER
131
M
134
M
132
LENS SYSTEM 101
101a
101b

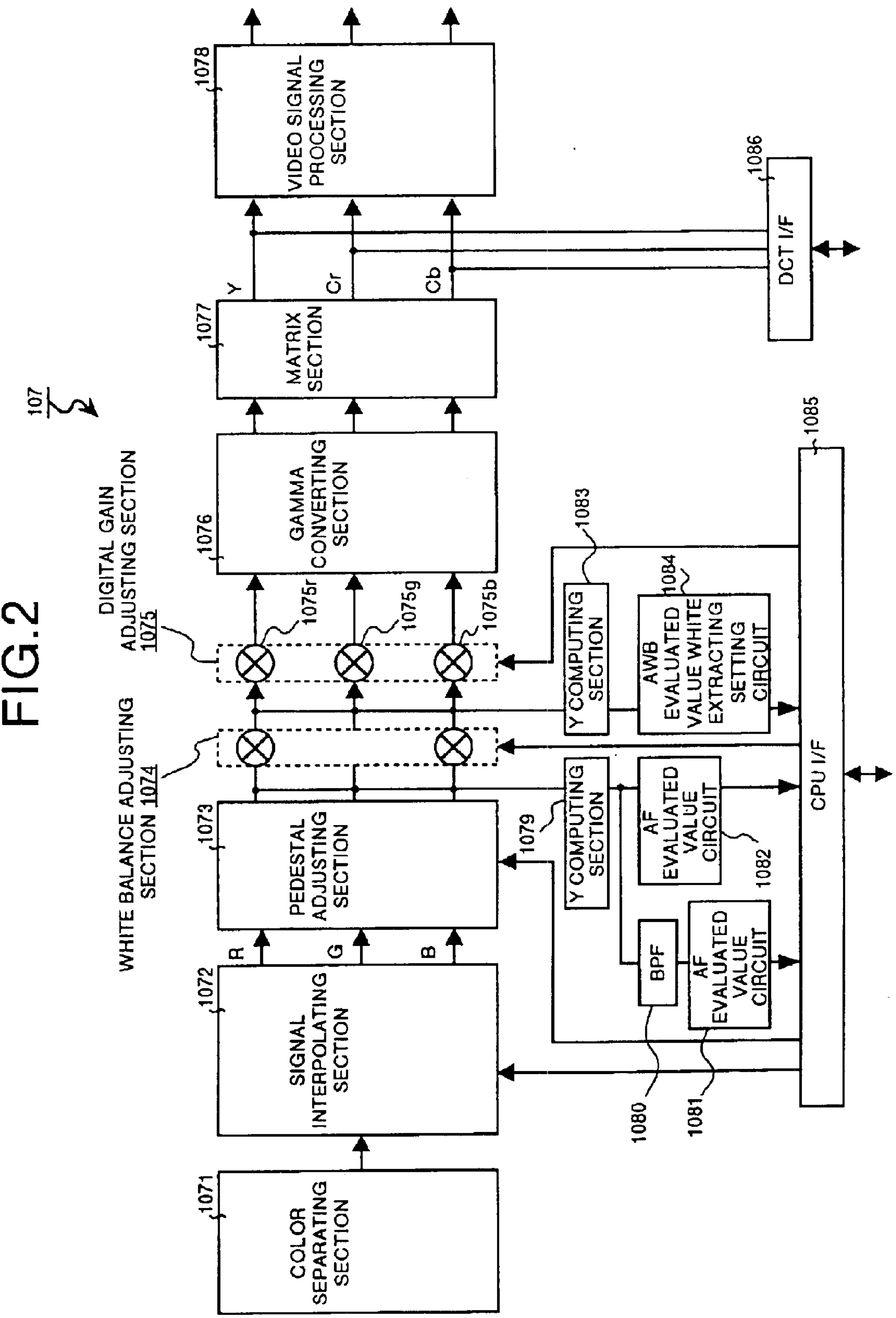
FIG.2
107
COLOR SEPARATING SECTION
1071
SIGNAL INTERPOLATING SECTION
1072
R
G
B
PEDESTAL ADJUSTING SECTION
1073
WHITE BALANCE ADJUSTING SECTION 1074
DIGITAL GAIN ADJUSTING SECTION 1075
1075r
1075g
1075b
GAMMA CONVERTING SECTION
1076
MATRIX SECTION
1077
Y
Cr
Cb
VIDEO SIGNAL PROCESSING SECTION
1078
Y COMPUTING SECTION
1079
BPF
1080
AF EVALUATED VALUE CIRCUIT
1081
AF EVALUATED VALUE CIRCUIT
1082
Y COMPUTING SECTION
1083
AWB EVALUATED VALUE WHITE EXTRACTING SETTING CIRCUIT
1084
CPU I/F
1085
DCT I/F
1086

FIG.3

| ZOOM STEP | ccdaf drv data | fp far def | fp near def | fp far calc | fp near calc | nml smp |
|---|---|---|---|---|---|---|
| 00 | 03 | 00 | 90 | 08 | 19 | 07 |
| 01 | 03 | 07 | 2d | 10 | 24 | 08 |
| 02 | 03 | 11 | 3b | 1b | 32 | 09 |
| 03 | 03 | 1a | 4b | 24 | 40 | 0a |
| 04 | 03 | 22 | 5b | 2c | 50 | 0b |
| 05 | 03 | 28 | 6c | 35 | 5f | 0c |
| 06 | 04 | 2a | 7c | 38 | 6f | 0d |
| 07 | 04 | 23 | 8b | 31 | 7c | 0e |
| 08 | 04 | 01 | 90 | 11 | 80 | 0f |

FIG.6

| | POS (I) | f (mm) | ZP | No.0 | | No.1 | | No.2 | |
|---|---|---|---|---|---|---|---|---|---|
| | | | | ∞ | 20cm | ∞ | 20cm | ∞ | 20cm |
| W END | 0 | 5.1 | 10 | 0 | 17 | 0 | 17 | 0 | 17 |
| : | 1 | 5.51 | 26 | 7 | 27 | 8 | 28 | 9 | 29 |
| : | 2 | 6.089 | 46 | 17 | 40 | 19 | 42 | 20 | 43 |
| : | 3 | 6.742 | 67 | 26 | 54 | 28 | 56 | 31 | 59 |
| M | 4 | 7.553 | 89 | 34 | 68 | 38 | 72 | 41 | 75 |
| : | 5 | 8.585 | 112 | 40 | 83 | 45 | 87 | 49 | 92 |
| : | 6 | 9.944 | 138 | 42 | 98 | 48 | 103 | 53 | 108 |
| : | 7 | 11.814 | 168 | 35 | 110 | 41 | 116 | 48 | 123 |
| T END | 8 | 14.55 | 206 | 1 | 112 | 9 | 120 | 17 | 128 |

131
FOCUS DRIVER
YCC
IN2
IN1
ENA
GND
OUT4
OUT3
OUT2
OUT1
SDF
133
ZOOM DRIVER
132 FOCUS PULSE MOTOR
134 ZOOM PULSE MOTOR
PB23 FM01
PB24 FM02
PB25 FM03
PB26 FM04
PB19 ZM01
PB28 ZM02
PB21 ZM03
PB27 ZM04
PB22
PB8
JUMPER LINE
GND
C4 5BY
2288pF
+-19X
C3 5BY
2288pF
+-18X
C1
+-28X 6.3Y 18uF
C2
+-28X 6.3Y 18uF
+5V
PB13 GND
PB12 +5V
PB5 FME
PB9 PMB
PB7 PMA
PB5 ZME
PB1 GND

FIG.9

| ENA | IN1 | IN2 | OUT1 | OUT2 | OUT3 | OUT4 | REFERENCE |
|---|---|---|---|---|---|---|---|
| L | — | — | OFF | OFF | OFF | OFF | STANDBY |
| H | L | L | H | L | H | L | TWO-PHASE EXCITATION |
| | L | H | H | L | L | H | |
| | H | H | L | H | L | H | |
| | H | L | L | H | H | L | |

VD 1/30Hz (33mS)

FOCUS MOTOR DRIVING TIMING WHEN A PIXEL NUMBER:1800×1200

FOCUS MOTOR DRIVING TIMING WHEN A PIXEL NUMBER:900×600

FOCUS MOTOR DRIVING TIMING WHEN A PIXEL NUMBER:640×480

AUTO-FOCUS APPARATUS BASED ON PIXEL RESOLUTION AND CONTROL METHOD FOR THE SAME

FIELD OF THE INVENTION

The present invention relates to an auto-focus apparatus and control method for the same, and more particularly to an auto-focus apparatus and control method for the same used in a digital camera or a digital video camera.

BACKGROUND OF THE INVENTION

A digital camera with various functions incorporated therein has become widespread in recent years. For example, a digital camera in which pixel number can be changed while recording has appeared in the market as well. This camera represents the needs of the user that sometimes they want to record the image at a higher quality and sometimes they want to record the image at a normal or lower quality. Namely, when an image to be recorded does not require high quality, a number of recording pixels is reduced while recording. Thus, the size of the file in which the image is recorded can be made smaller. The size of the file in which the image is recorded is becoming larger in association with the present trend of increase in the number of pixels in a CCD.

In addition, high-resolution AF control is demanded even under the conditions of the same focal length and the same CCD size in association with the present trend of increase in the number of pixels in a CCD.

In a digital camera which samples a AF evaluated value while driving a focus lens and detects a focus position, it is required to make smaller the interval of sampling of the AF evaluated value in order to provide AF control with high precision in a CCD having a large number of pixels therein. However, if the sampling interval is made smaller, a longer time is disadvantageously required for focusing.

SUMMARY OF THE INVENTION

It is an object of the present invention to provide, for the purpose of solving the problems described above, an auto-focus apparatus and control method for the same enabling high-precision focusing within a short period of time even when a CCD with a large number of pixels is used.

The auto-focus apparatus of the present invention comprises an image pickup device for converting light from an object through a focus lens system to electric signals and outputting the signals as image data; an A/D converting unit for A/D-converting the image data to obtain digital image signals; an AF evaluating unit for outputting an AF evaluated value obtained by integrating high-frequency components of brightness data for the digital image data; a sampling unit for sampling the AF evaluated value obtained by the AF evaluating unit while driving a position of the focus lens system; a recording pixel number setting unit for setting a number of recording pixels of the image pickup device for recording an image; and a focus driving unit for determining a focus according to a result of sampling of the AF evaluated value by the sampling unit and driving the focus lens system to the focus position; wherein amount of shift of the focus lens system for each sampling when sampling the AF evaluated value is changed according to a number of recording pixels set by the recording pixel number setting unit. Thus, the amount of shift of the focus lens system for each sampling when sampling the AF evaluated value can be changed according to a number of recording pixels set by the recording pixel number setting unit.

The auto-focus apparatus of the present invention comprises an image pickup device for converting light from an object through a focus lens system to electric signals and outputting the signals as image data; an A/D converting unit for A/D-converting the image data to obtain digital image signals: an AF evaluating unit for outputting an AF evaluated value obtained by integrating high-frequency components of brightness data for the digital image data; a sampling unit for sampling the AF evaluated value obtained by the AF evaluating unit while driving a position of the focus lens system; a recording pixel number setting unit for setting a number of recording pixels of the image pickup device for recording an image; and a focus driving unit for determining a focus according to a result of sampling of the AF evaluated value by the sampling unit and driving the focus lens system to the focus position: wherein during a first auto-focus operation, amount of shift of the focus lens system for sampling the AF evaluated value is set to a maximum and a substantial focus position is calculated; and during second auto-focus operation and thereafter, amount of shift of the focus lens system for sampling the AF evaluated value is set at a position closer to the substantial position to a minimum and the final focus position is obtained; and number of times the auto-focus operations are performed is changed according to the number of recording pixels set by the recording pixel number setting unit. Thus, a substantial focus position is obtained first and then a precise focus position is obtained from this substantial position.

Other objects and features of this invention will become understood from the following description with reference to the accompanying drawings.

BRIEF DESCRIPTION OF THE DRAWINGS

FIG. 2 shows a concrete example of the configuration of the IPP shown in FIG. 1;

FIG. 3 is a view for explaining an auto-focus operation according to an embodiment;

FIG. 6 is view showing a ZF table used when a focus position corresponding to a zoom position is adjusted in the embodiment;

FIG. 9 is a view showing a truth table of a pulse motor driving IC in the driver shown in FIG. 8;

DESCRIPTION OF THE PREFERRED EMBODIMENTS

Detailed description is made hereinafter for the preferred embodiments of an auto-focus apparatus and control method for the same according to the present invention with reference to the attached drawings.

Figure 1:
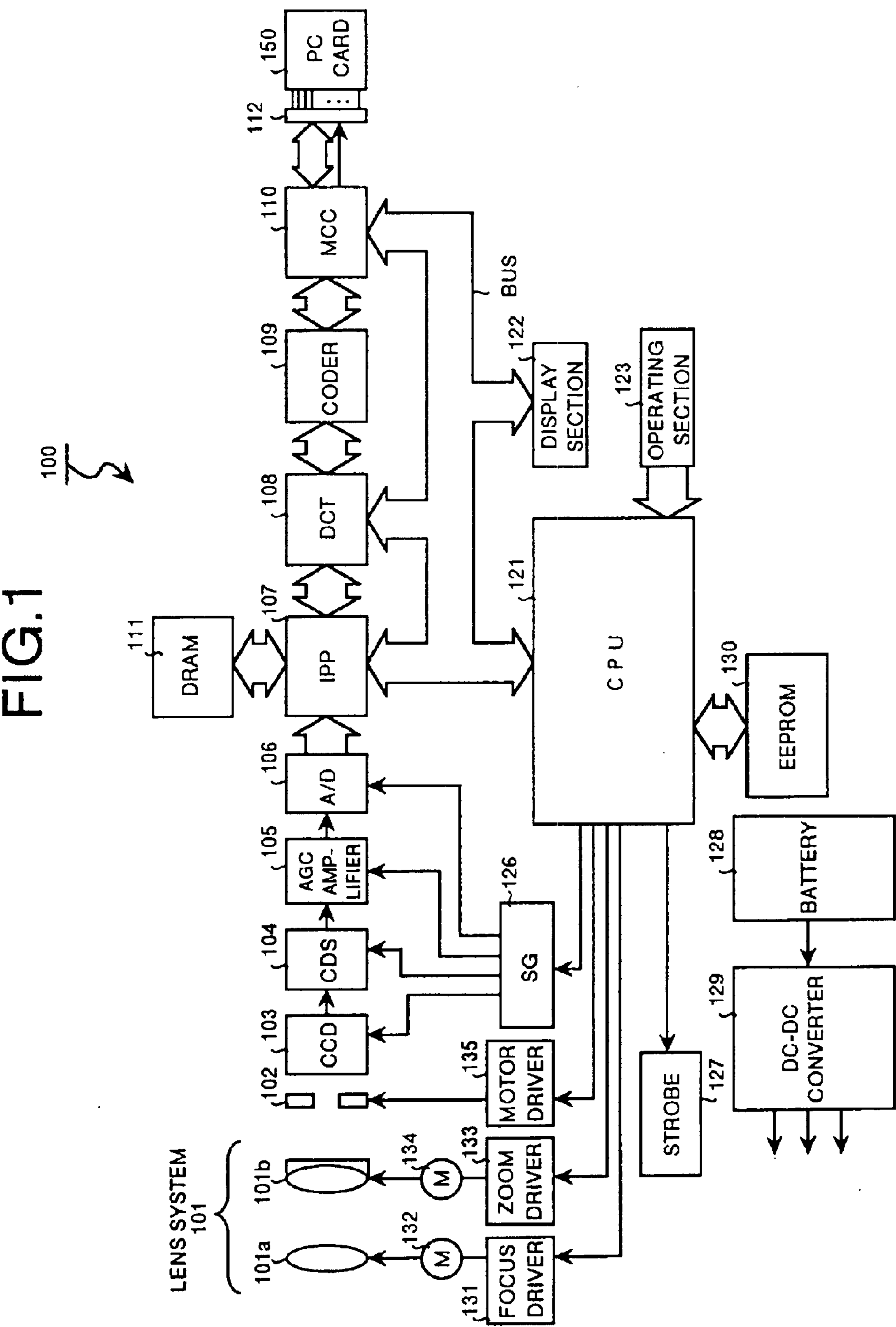
FIG. 1 shows the configuration of a digital camera according to the present invention.

FIG. 1 is a block diagram showing a digital camera with an auto-focus apparatus according to an embodiment of the present invention applied therein. In this figure, the reference numeral 100 indicates the digital camera. This digital camera 100 comprises a lens system 101, a mechanical system 102 including a lens aperture and a filter or the like, a CCD (Charge-Coupled Device) 103, a CDS (Correlation Double Sampling) circuit 104, an automatic gain control amplifier (AGC amplifier) 105, an A/D converter 106, an IPP (Image Pre-Processor) 107, a DCT (Discrete Cosine Transform) 108, a coder 109, a MCC (Memory Card Controller) 110, a DRAM 111, a PC (personal Computer) card interface 112, a CPU (Central Processing Unit) 121, a display section 122, an operating section 123, a SG (control signal generating) section 126, an a strobe 127, battery 128, a DC-DC converter 129, an EEPROM 130, a focus driver 131, a pulse motor 132, a zoom driver 133, a pulse motor 134, and a motor driver 135. A detachable PC card 150 can be connected via the PC card interface 112 to this digital camera 100.

A lens unit comprises the lens system 101 and the mechanism 102 containing components such as a focus and a filter. A mechanical shutter in the mechanism 102 simultaneously executes exposure to two fields. The lens system 101 comprises, for instance, a vari-focal lens, and includes a focus lens system 101*a* and a zoom lens system 101*b*.

The focus driver 131 can move the focus lens system 101*a* in a light-axis direction by driving the pulse motor 132 based on a control signal supplied from the CPU 121. The zoom driver 133 can move the zoom lens system 101*b* in the light-axis direction by driving the pulse motor 134 based on a control signal supplied from the CPU 121. The motor driver 135 drives the mechanism 102 according to a control signal supplied from the CPU 121 to a value set for instance for focusing.

The CCD 103 converts an image inputted via the lens unit to an electric signal (analog image data). The CDS circuit 104 is provided in order to reduce the noise from the signal outputted from the CCD type of image pick-up element.

The AGC amplifier 105 corrects a level of a signal having been subjected to correlation double sampling in the CDS circuit 104. A gain in the AGC amplifier 105 is set when set data (a control voltage) is set by a CPU 121 via a D/A converter incorporated in the CPU 121 in the AGC amplifier 105. Then the A/D converter 106 converts analog image data inputted by the CCD 103 via the AGC amplifier into a digital image data. In other words, the output signal from the CCD 103 is converted into a digital signal with an optimal sampling frequency (for instance, a frequency which is a few integer number times higher than a sub-carrier frequency of NTSC signal) in the A/D converter 106 after passing the signal via the CDS circuit 104 and AGC amplifier 105.

The IPP 107, the DCT 108, and the coder (Huffman encoder/decoder) 109 each constituting a digital signal processing section execute various types of data processing such as corrections, compression and expansion of image data for chromainance (Cb, Cr) and brightness (Y) with respect to the digital image data inputted from the A/D converter 106.

The MCC 110 once stores therein the compressed image data, and records the image data via the PC card interface 112 in the PC card 150 or reads the image data from the PC card 150.

The CPU 121 uses a RAM as a work area according to a program stored in a ROM, and controls all the operations of components of the digital camera 100 according to instructions from a operating section 123 or those from external devices such as a remote control unit not shown herein. More specifically, the CPU 121 provides controls over image picking, auto-exposure (AE), automatic white balance (AWB) adjustment, auto-focusing or the like.

The power is supplied from a battery 128 which may be a NiCd (nickel-cadmium) battery, a nickel-hydrogen battery, a lithium battery or the like to the DC-DC converter 129, and then the power is supplied into the other components of the digital camera 100.

The display section 122 is formed with LCD, LED, EL or the like, and this display section displays the picked up digital image data or recorded image data subjected to processing for expansion or the like. The operating section 123 has buttons for setting the parameters for various types of operation such as selection of a function, inputting an instruction for photographing, or the like from outside. More specifically, the operating section 123 has a release key for instructing photographing and keys for setting a number of recording pixels (any of 1800×1200, 900×600, and 640×480). Data for adjustment used when the CPU 121 controls operations of the digital camera is written in the EEPROM 130.

The digital camera 100 (to be precise, the CPU 121) has three modes. First, a recording mode in which the camera can store the image data obtained by photographing an object into the PC card 150. Second, a display mode in which the camera can display the image data stored in the PC card 150. Third, a monitoring mode in which the camera can directly display the picked up image data on the display section 122.

FIG. 2 shows a concrete example of the configuration of the IPP 107. The IPP 107 comprises, as shown in FIG. 2, a color separating section 1071 which separates the R, G, and B components from the digital image data inputted from the A/D converter 106, a signal interpolating section 1072 for interpolating between the separated R, G, and B components of the image data, a pedestal adjusting section 1073 for adjusting a black level of the R, G, and B components of the image data, a white balance adjusting section 1074 for adjusting a white level of the R and B components of the image data, a digital gain adjusting section 1075 for correcting the R, G, and B components of the image data with the gain set by the CPU 121, a gamma converting section 1076 for γ-converting the R, G, and B components of the image data, a matrix section 1077 for separating the R, G, and B components of the image data into a color difference signal (Cb, Cr) and a brightness signal (Y), and a video signal processing section 1078 which prepares a video signal according to the color difference signal (Cb, Cr) and brightness signal (Y) and outputs this video signal to the display section 122.

Furthermore, the IPP 107 comprises a Y computing section 1079 for detecting brightness data (Y) for image data after being subjected to pedestal adjustment by the pedestal adjusting section 1073, a BPF 1080 for passing therethrough only a specified frequency component of the brightness data (Y) detected in the Y computing section 1079, an AF evaluated value circuit 1081 for outputting an integrated value of the brightness data (Y) passing through the BPF 1080 to the CPU 121 as an AF evaluated value, an AE evaluated value circuit 1082 for outputting a digital count value corresponding to the brightness data (Y) detected in the Y computing section 1079 to the CPU 121 as an AE evaluated value. The IPP 107 also comprises, a Y computing section 1083 for detecting brightness data (Y) for the R, G, and B components of the image data after being subjected to gain adjustment by the white balance adjusting section 1074, an AWB evaluated value white extracting setting circuit 1084 for counting brightness data (Y) for each data detected in the Y computing section 1083 to output the data to the CPU 121 as an AWB evaluated value for each color, a CPU I/F 1085 as an interface with the CPU 121, and a DCT I/F 1086 as an interface with the DCT 108.

Next description is made for auto-focus control. For the auto-focus control, after a shutter speed and a gain are set, the pulse motor 132 is driven according to specified pulses for a 1 Vd period. When the specified pulses are being provided, a digital video signal obtained in the IPP 107 is processed to obtain a brightness signal. High-frequency components of this brightness signal are integrated to obtain an AF evaluated value, and the peak of this AF evaluated value is considered as a focus position.

For zoom control, at which position (distance) in a range from a set value "fp far calc" (infinity) described later to a set value "fp near calc" (the nearest position; around 0.2 m) a current focus position exists can be computed by means of a ratio. The focus position is driven to a focus position that becomes the same ratio as the above ratio from "fp far def" and "fp near def" at the zoom point in association with zoom driving, and the object is brought into focus by correcting the zooming of the vari-focal lens.

Next description is made for set values as the adjusted values for auto-focus operations. FIG. 3 explains the set values. It is assumed that auto-focusing is performed, as shown in FIG. 3, by using a vari-focal lens having nine zoom-steps (positions) from 00 to 08. Furthermore, a range of the photographing distance is from Infinity to around 0.2 m, and is to around 0.01 m only for a wide-angle shot.

In the table shown in FIG. 3, each of the zoom steps has six types of set value of "ccdaf drv data", "fp far def", "fp near def", "fp far calc", "fp near calc", and "nml smp" correlated thereto respectively. Each of the set values in FIG. 3 is represented in hexadecimal notion.

Herein, the "ccdaf drv data" represents amount of shift (a number of pulses) of a focus lens system for each sampling when an AF evaluated value is sampled. The "fp far def" represents the starting position of sampling the AF evaluated value in each zoom step and a difference from a position of a number of pulses "fp inf def" generated for focusing as a reference has been inputted thereto as data.

The "fp near def" represents the end position of sampling the AF evaluated value in each of the zoom steps and a difference from the position of a number of pulses "fp inf def" generated for focusing as a reference has been inputted thereto as data. The "fp far calc" represents an infinity position in each of the zoom steps and a difference from the position of a number of pulses "fp inf def" generated for focusing as a reference has been inputted thereto as data.

The "fp near calc" represents a position of 0.2 m in each of the zoom steps and a difference from the position of a number of pulses "fp inf def" generated for focusing as a reference has been inputted thereto as data. The "nml smp" represents a number of samplings for driving of the sampling focus lens along the entire area where sampling of the AF evaluated values is inevitably executed regardless of a sampling result of AF evaluated values.

The "fp inf def" represents a number of pulses generated for focusing from an mechanical end in the infinity side of the focus to a starting point of sampling the AF evaluated value.

Figure 4:
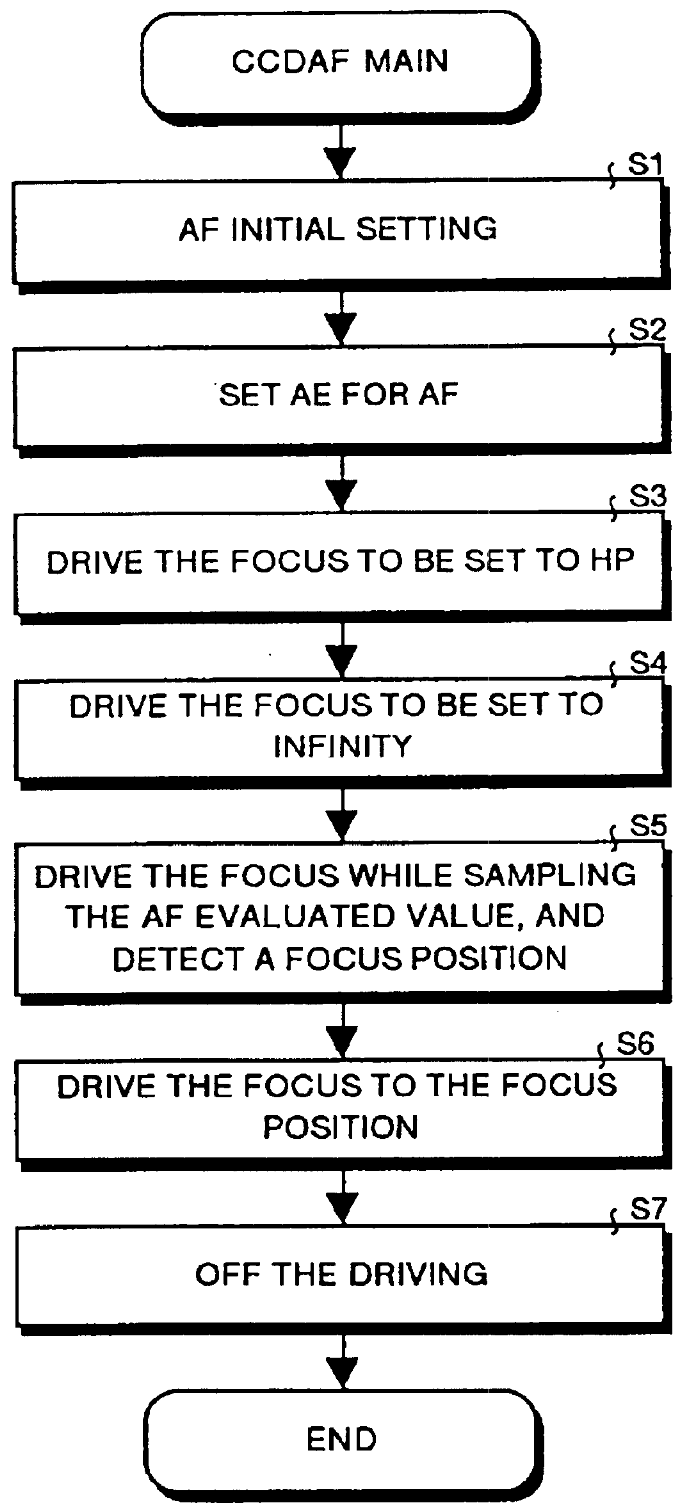
FIG. 4 is a flow chart for explaining a setting operation for performing the auto-focus operation according to the embodiment.

Operations are described here. FIG. 4 is a flow chart for explaining a setting operation for performing the auto-focus operation, and FIG. 5 is a flow chart for explaining the auto-focus operation.

Figure 5:
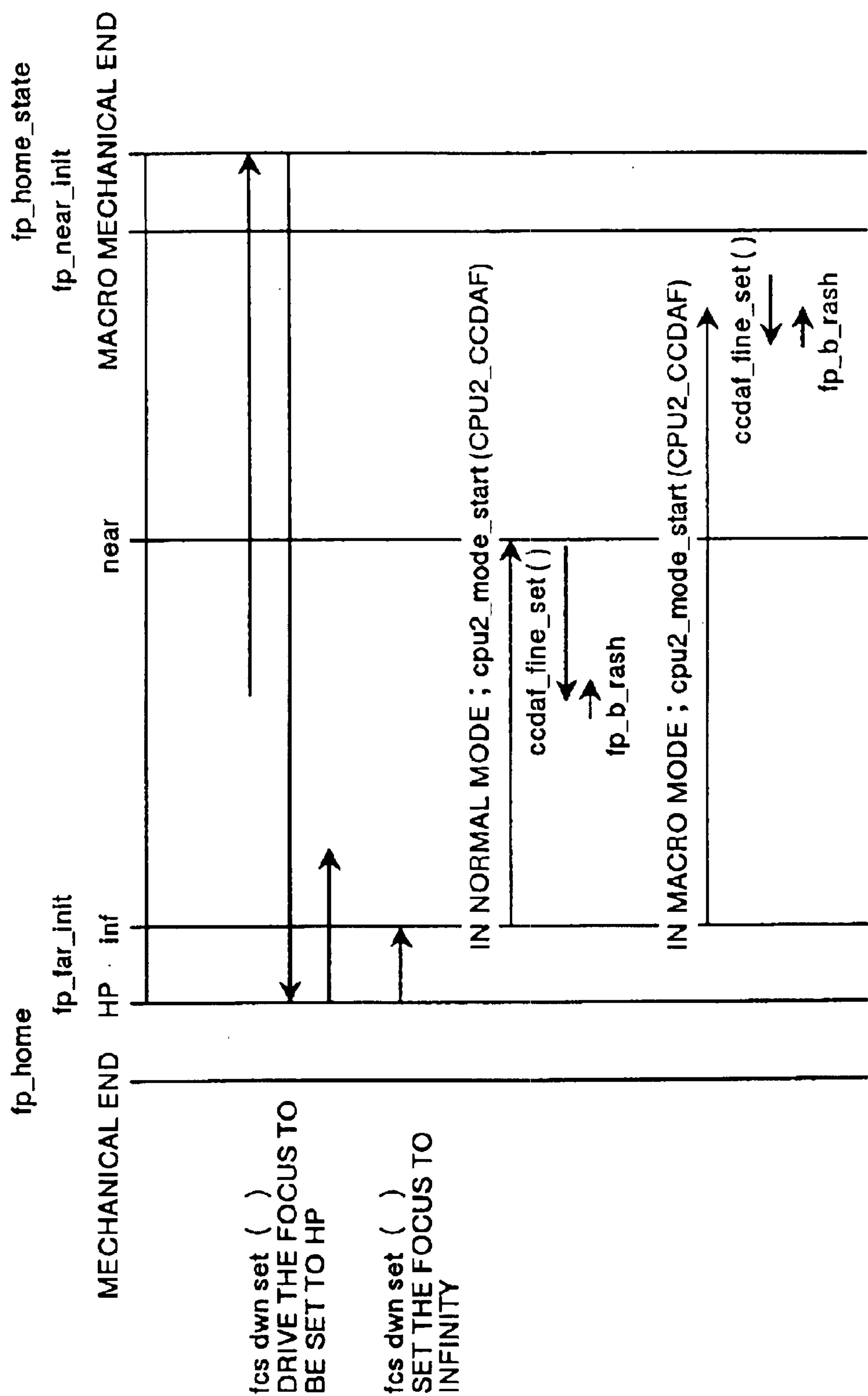
FIG. 5 is a view for explaining the set values according to an embodiment.

In FIG. 5. each set value is described as follows:

fp_far_init=a number of pulses generated for focusing (fp inf def)−AF evaluated value sampling starting position (fp far def [zoom]), fp near init=a number of pulses generated for focusing (fp inf def)+AF evaluated value sampling end position (fp near def [zoom]), fp_home=(fp_far_init)−(fp home def), and nml smp def=nml smp [zoom].

Herein, zoom represents a position in the nine zoom steps, and zoom=0 represents a position of "wide", zoom=4 represents a position of "mean", and zoom=8 represents a position of "tele".

In the operation shown in FIG. 5, at first, zoom reset is executed by matching a zoom position with a number of pulses for zoom driving, and then focus reset is executed by matching a focus position with a number of pulses for focus driving. The zoom reset and focus reset are executed by driving each position to the mechanical end respectively.

A position after driving with a number of pulses more than that for driving each position to the mechanical end is decided as a position of a specified number of pulses. Herein, in case of focus, fp max=205 pulses is shown at the mechanical end in the "near" side. Data for a last pulse output when driving the focus to the mechanical end is set on adjustment as fp_home_state. Then, the focus is set at a normal focal position (around 2.5 m) and further zoom is executed.

Then, the operation shown in FIG. 4 is started. The operation mode shown in FIG. 4 is an auto-focus mode. In this auto-focus mode, at first, the AF initial, settings (ccdaf init set) are executed (step S1), and first release is operated. In this process, a normal focal point (around 2.5 m) at the set zoom point is computed from the adjusted value, and auto-focusing is performed. Then, setting of auto-exposure (ccdaf ae set) for auto-focusing is executed (step S2).

Then, when the processing shifts to step S3, the focus is driven to the home position HP (fp_home). In step S4, the focus is driven to the initial position (to the Infinity) INIT (fp_far_init). As described above, by driving the focus from the home position HP to the initial position INIT, backlash (fp_b_rash=8 (pulses)) can be removed.

After step S4, the processing shifts to step S5. Driving of the focus at the time of sampling an AF evaluated value is executed in synchronism with a vertical synchronizing signal Vd. In that case, the focus is shifted by an amount (ccdaf drv data) of a focus lens system for each sampling. In this process, driving of the focus is continued as far as (up to (ccdaf drv data) * (nml smp)) as the amount of shift of the focus by the time when the AF evaluated value at the "near" position (by nml smp) is sampled regardless of any value (information such as a peak) of the AF evaluated values. This is within a normal range of a photographing distance (from Infinity to around 0.5 m).

Herein, a peak position and data for fluctuations in an AF evaluated value or the like are computed from the AF evaluated value sampled within the normal range of a photographing distance, and it is determined whether a focus position exists within the normal range of a photographing distance or not. Even when focusing is executed within a macro range of a photographing distance, the focus lens is driven to a focus position after the focus is driven from the focus position to a position where backlash is removed.

After step S5, the processing shifts to step S6. In step S6, when a focus position is within the normal range of a photographing distance, sampling of the AF evaluated value is stopped, the focus is driven from the focus position to a position where backlash is remove, and the focus is driven to the focus position.

Furthermore, when the focus position is not within the normal range of a photographing distance, the AF evaluated value within the macro range of a photographing distance (from around 0.5 m to around 0.2 m) is sampled (up to macro: fp near init). However, sampling of the AF evaluated value is stopped when a peak is detected within the macro range of photographing distance.

After S6, the processing shifts to step S7. In step S7, the driving of the focus is turned OFF (fcsm off), and the processing is terminated.

A relation between a zoom position and focus position is explained here. FIG. 6 is a view showing a ZF (zoom-focus) table for focus position adjustment, and FIG. 7 shows the same the ZF table in FIG. 6 in a graphical form.

The ZF table is used for adjusting a focus position with respect to a zoom position. The ZF table shown in FIG. 6 shows three cases of No. 0, No. 1, and No. 2. In any of the cases, nine positions between a Wide (W) end . . . a Mean (M) . . . a Tele (T) end are allocated to two references of Infinity and Minimum range (e.g., 20 cm). Correlated to each of the positions are a number of pulses ZP and an adjusted value (f (mm)). This ZF table is stored in a ROM or the like.

Figure 7:
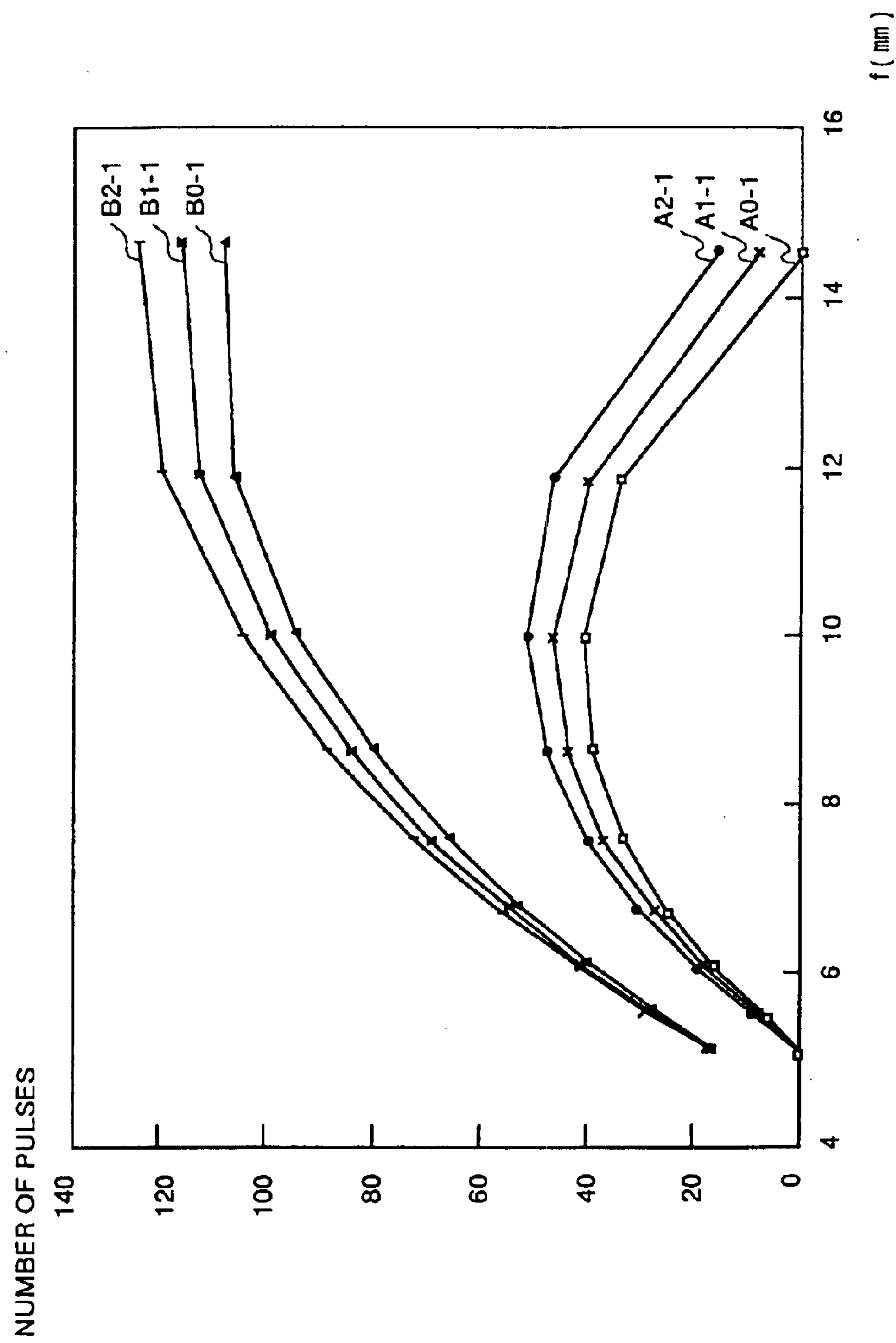
FIG. 7 is a view showing the ZF table in FIG. 6 in a graphical form.

FIG. 7 shows Infinity reference A0-1 and Minimum range reference B0-1 as a graph of No. 0, Infinity reference A1-1 and Minimum range reference B1-1 as a graph of No. 1, and Infinity reference A2-1 and Minimum range reference B2-1 as a graph of No. 2. It is clear from the graph described above that the number of pulses becomes larger in the case of Minimum range reference as compared to that in the case of Infinity reference.

Figure 8:
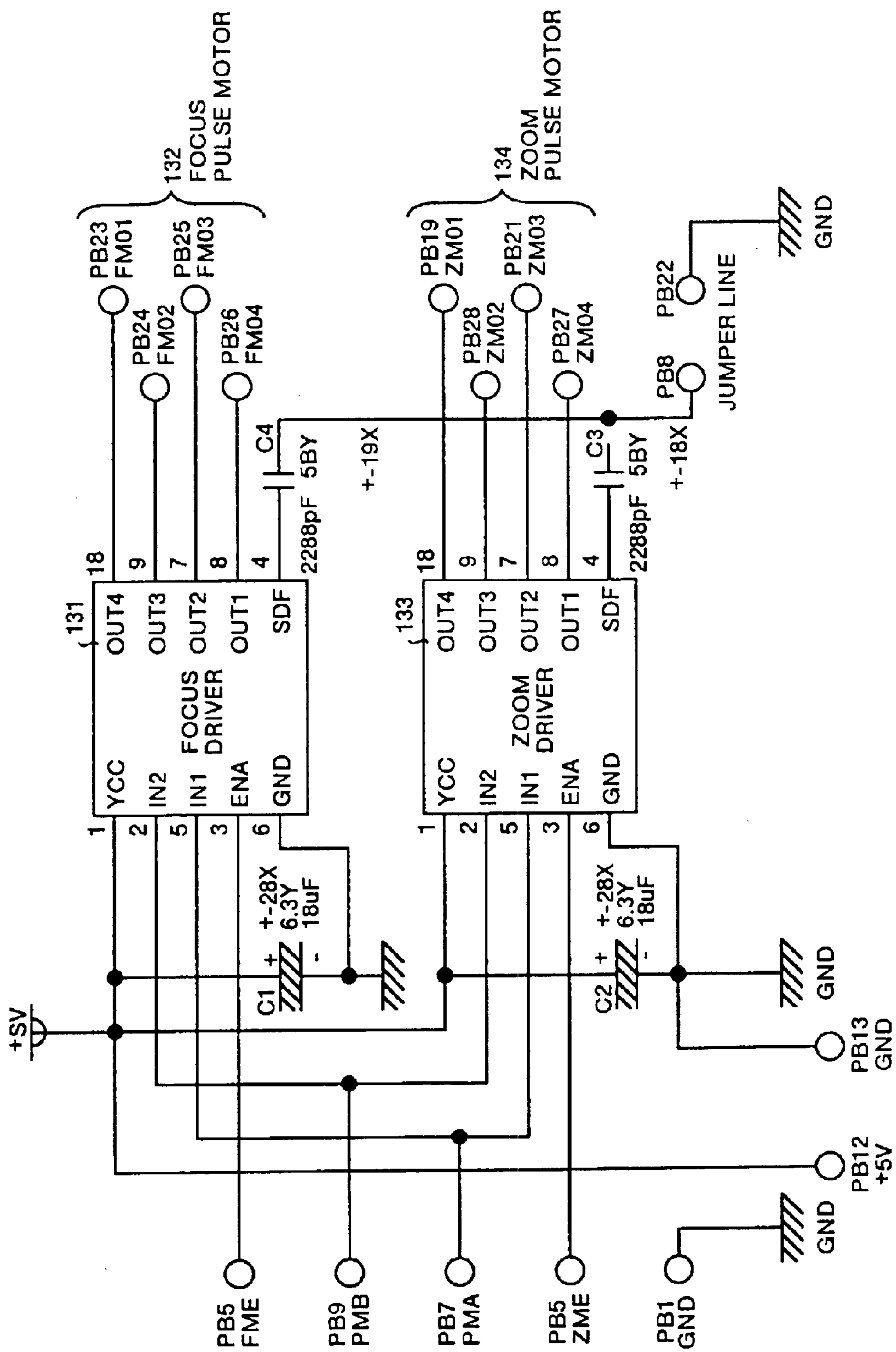
FIG. 8 is a circuit diagram showing driver of a zoom pulse motor and driver of a focus pulse motor according to the embodiment.

Detailed description is made hereinafter for a driver. FIG. 8 is a circuit diagram showing drivers of a zoom pulse motor 132 as well as of a focus pulse motor 134 (focus driver 131 and zoom driver 133), and FIG. 9 is a view showing a truth table of a pulse motor driving IC. In FIG. 8, the focus driver 131 and zoom driver 133 define a relation of input/output according to the truth table shown in FIG. 9.

According to the truth table shown in FIG. 9, when an enable signal in each of the circuits is "L" (LOW), there is no input (IN 1, 2) into the focus driver 131 and zoom driver 133 shown in FIG. 8 but an standby state therein is effected, therefore each output (OUT 1, 2, 3, and 4) is OFF. On the other hand, when the enable signal is "H" (HIGH), OUT 1 to 4 which are driven and outputted are outputs each for generating changes in two-phase excitation from a logical relation between the inputs IN 1 and IN 2.

Figures 10A, 10B, 10C, 10D:
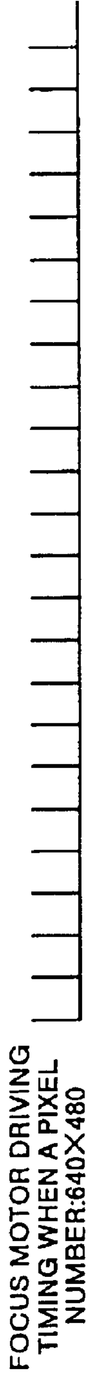
FIG. 10A to FIG. 10D are a timing chart showing timings of pulses to drive the focus pulse motor.

FIG. 10A to FIG. 10D are timing charts showing timings of pulses to drive the focus pulse motor 132. FIG. 10A shows VD (vertical synchronizing signal), FIG. 10B shows a driving timing of the focus pulse motor 132 when a number of recording pixels in the CCD 103 is 1800×1200, FIG. 10C shows a driving timing of the focus pulse motor 132 when a number of recording pixels in the CCD 103 is 900×600, and FIG. 10D shows a driving timing of the focus pulse motor 132 when a number of recording pixels in the CCD 103 is 640×480.

Next description is made for examples (control example 1 and control example 2) of controlling the auto-focusing operation by the CPU 121 according to a number of recording pixels in the CCD 103.

(Control Example 1)

At first, description is made for a case where a sampling interval of the AF evaluated value is changed according to a set number of recording pixels in the CCD 103 (where the amount of shift of the focus lens system 101*a* is changed) as a first example.

Figure 11:
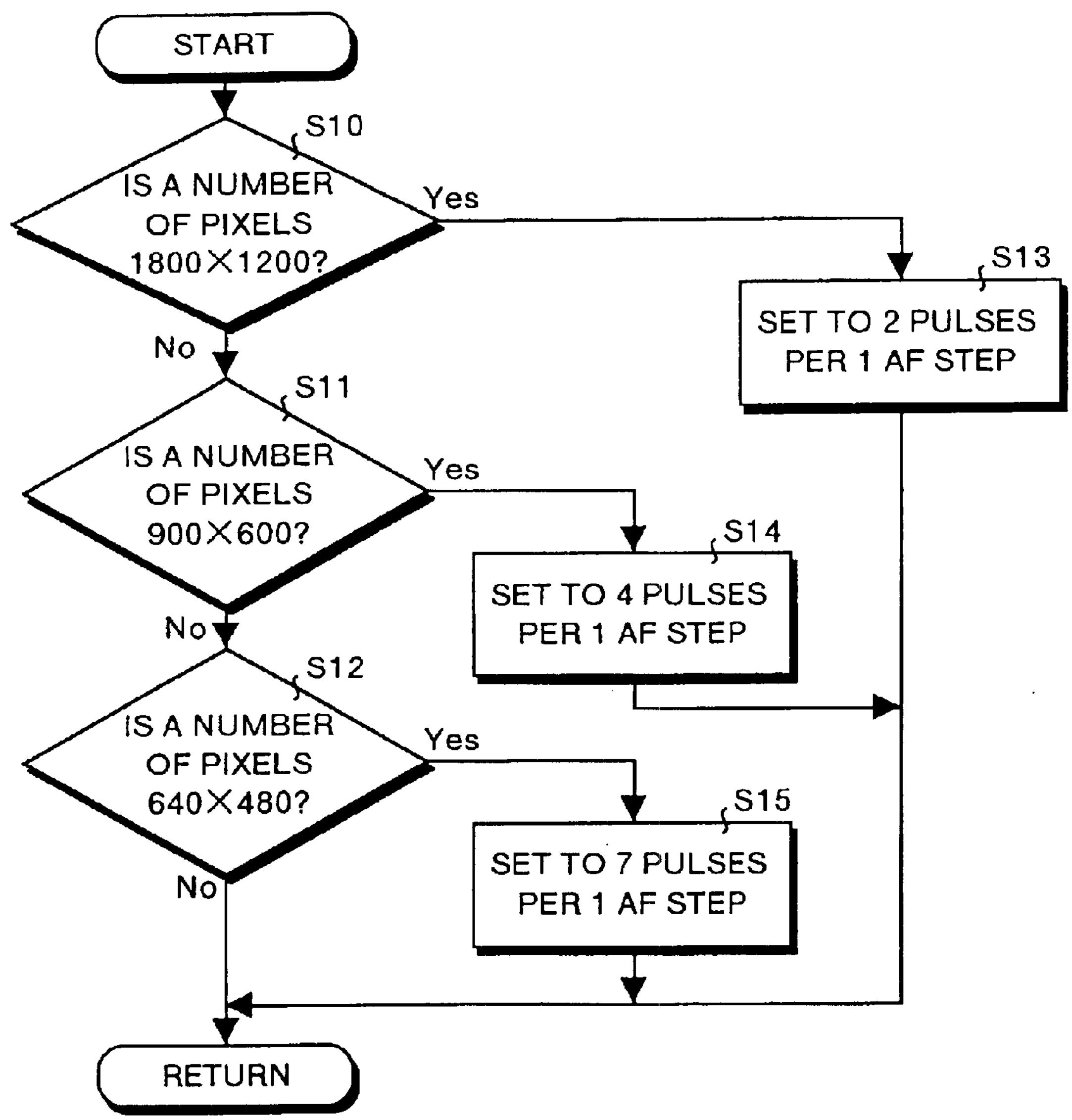
FIG. 11 is a flow chart for explaining the operation by a CPU when controlling the auto-focusing when the interval at which the AF evaluated value is sampled is changed according to a set number of recording pixels in the CCD.

FIG. 11 is a flow chart for explaining control of an AF operation by the CPU 121 when a sampling interval of an AF evaluated value is changed according to a set number of recording pixels in the CCD 103. Control of the auto-focusing by the CPU 121 will be described hereinafter with reference to the flow chart in FIG. 11.

The CPU 121 follows the following steps. At first, the CPU 121 determines whether a number of recording pixels in a CCD 103 has been set to 1800×1200 or not (step S10). The CPU 121 sets the pulse to drive the focus pulse motor 132 to 2 pulses per 1 AF step when the number of recording pixels in the CCD 103 is set to 1800×1200 (step S13). On the other hand, the processing shifts to step S11 when the number of recording pixels in the CCD 103 is not set to 1800×1200.

In step S11, the CPU 121 determines whether the number of recording pixels in the CCD 103 has been set to 900×600 or not. The CPU 121 sets the pulse to drive the focus pulse motor 132 to 4 pulses per 1 AF step when the number of recording pixels in the CCD 103 is set to 900×600 (step S14). On the other hand, the processing shifts to step S12 when the number of recording pixels in the CCD 103 is not set to 900×600.

In step S12, the CPU 121 determines whether the number of recording pixels in the CCD 103 has been set to 640×480 or not. The CPU 121 sets the pulse to drive the focus pulse motor 132 to 7 pulses per 1 AF step when the number of recording pixels in the CCD 103 is set to 640×480 (step S15). On the other hand, the processing is terminated when the number of recording pixels in the CCD 103 is not set to 640×480.

Then, the focus pulse motor 132 drives the focus lens according to the pulses set by the CPU 121. With this operation, the sampling interval of the AF evaluated value is shorter (amount of shift of the focus lens system 101*a* is made smaller) when a larger number of recording pixels is set in the CCD 103, so that auto-focusing is possible with such precision as required by the number of recording pixels in the CCD 103.

As described above, in the above mentioned example of operation, a sampling interval of the AF evaluated value is changed according to a set number of recording pixels in a CCD 103, therefore the changed interval can be applied to a sampling interval of the AF evaluated value to obtain auto-focusing precision required by a number of pixels in a CCD 103 on recording, while the time required for the auto-focusing can be reduced when there is only a small number of pixels in a CCD 103 on recording.

(Control Example 2)

Figure 12:
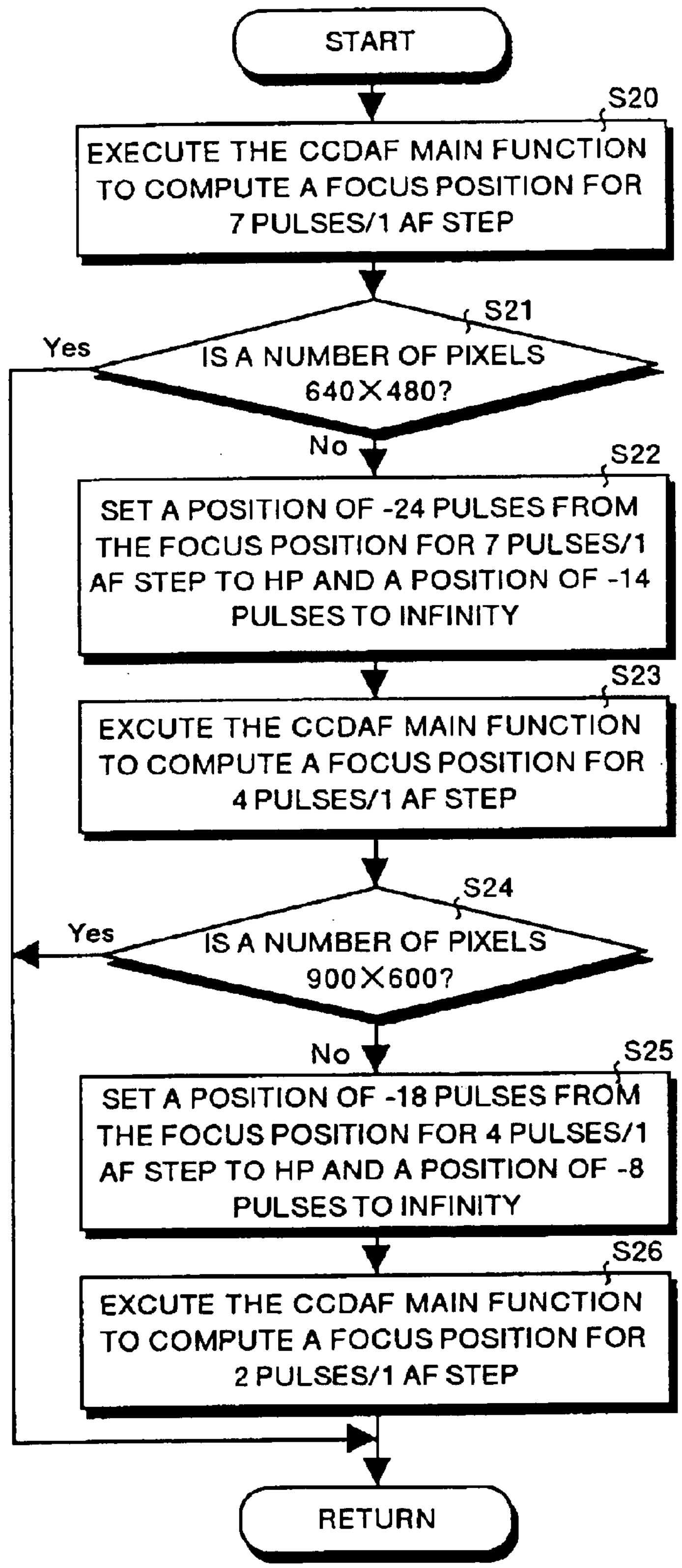
FIG. 12 is a flow chart for explaining the operation by a CPU when controlling the auto-focusing when the focusing is performed a plurality of times according to a set number of recording pixels in the CCD.

Description is made for a case where auto-focusing is executed a plurality of times according to a set number of recording pixels in a CCD 103 as a second example. FIG. 12 is a flow chart for explaining control of an AF operation by the CPU 121 when a focusing operation is executed a plurality of times according to the set number of recording pixels in the CCD 103. Control of an AF operation by the CPU 121 will be described hereinafter with reference to the flow chart in FIG. 12.

The CPU 121 follows the following steps. At first, the CPU 121 sets the pulse for driving the focus pulse motor 132 to 7 pulses per 1 AF step even when a number of recording pixels in the CCD 103 is set to any of 1800×1200, 900×600, or 640×480, and executes the CCDAF main function (Refer to FIG. 4) (step S20). With this operation, a substantial focus position is identified.

Next description is made for a case where a final focus position is identified from the substantial focus position. A sampling interval of an AF evaluated value (the amount of drive by the focus pulse motor 132) in a second focus operation and thereafter is made different according to a number of recording pixels in a CCD 103.

At first, in step S21, it is determined whether the number of recording pixels in a CCD 103 has been set to 640×480 or not. When it is determined that the number of recording pixels in the CCD 103 has been set to 640×480, the CPU 121 terminates the processing.

On the other hand, when the number of recording pixels in the CCD 103 is not set to 640×480, namely when the number of recording pixels in the CCD 103 has been set to 1800×1200 or 900×600, a position of −24 pulses from the focus position for 7 pulses per 1 AF step is set to HP, and a position of −14 pulses therefrom is set to Infinity (step S22). Then, the pulse for driving the focus pulse motor 132 is set to 4 pulses per 1 AF step to execute the CCDAF main function and a focus position is identified (step S23).

Then, it is determined whether the number of recording pixels in the CCD 103 has been set to 900×600 or not (step S24). When it is determined that the number of recording pixels in the CCD 103 has been set to 900×600, the CPU 121 terminates the processing.

On the other hand, when the number of recording pixels in the CCD 103 is not set to 900×600, namely when the number of recording pixels in the CCD 103 has been set to 1800×1200, a position of −18 pulses from the focus position for 4 pulses per 1 AF step is set to HP, and a position of −8 pulses therefrom is set to Infinity (step S25). Then, the pulse for driving the focus pulse motor 132 is set to 2 pulses per 1 AF step to execute the CCDAF main function (Refer to FIG. 4) and a focus position is identified (step S26).

To conclude, when the number of recording pixels in the CCD 103 is 640×480, the CPU 121 identifies a focus position, as a final focus position, where one focus operation is executed, namely where the auto-focusing is executed by setting the pulse to 7 pulses per 1 AF step. When the number of recording pixels in the CCD 103 is 900×600, the CPU 121 identifies a focus position, as a final focus position, where focus operations are executed twice, namely where the auto-focusing is executed by setting the pulse to 7 pulses per 1 AF step and then the auto-focusing executed by setting the pulse to 4 pulses per 1 AF step. When the number of recording pixels in the CCD 103 is 1800×1200, the CPU 121 identifies a focus position, as a final focus position, where focus operations are executed three times, namely where the auto-focusing is executed by setting the pulse to 7 pulses per 1 AF step, the auto-focusing is executed by setting the pulse to 4 pulses per 1 AF step, and finally the auto-focusing is executed by setting the pulse to 2 pulses per 1 AF step.

As described above, in the above mentioned example of operation, a number of times an auto-focusing is performed is made different according to a number of pixels in a CCD 103 on recording, therefore the changed number of times can be applied to a number of times of auto-focusing to obtain auto-focusing precision required by a number of pixels in a CCD 103 on recording, while the time required for the auto-focusing can be reduced when there is only a small number of pixels in a CCD 103 on recording.

Furthermore, as the sampling interval of an AF evaluated value when the second auto-focusing and thereafter is executed is made smaller than the sampling interval of the previous AF evaluated value, an accurate focus position can be identified. In other words, it is possible to reduce the time required for the entire auto-focusing, as the above embodiment of the present invention, by making a sampling interval longer to identify a substantial focus position in the first auto-focusing and making the sampling interval closer at a position adjacent to the substantial focus position to identify a final focus position in the second auto-focusing and on as compare to that in the case of identification of a final focus position by making the sampling interval of the AF evaluated value closer in one auto-focusing.

Figure 13:
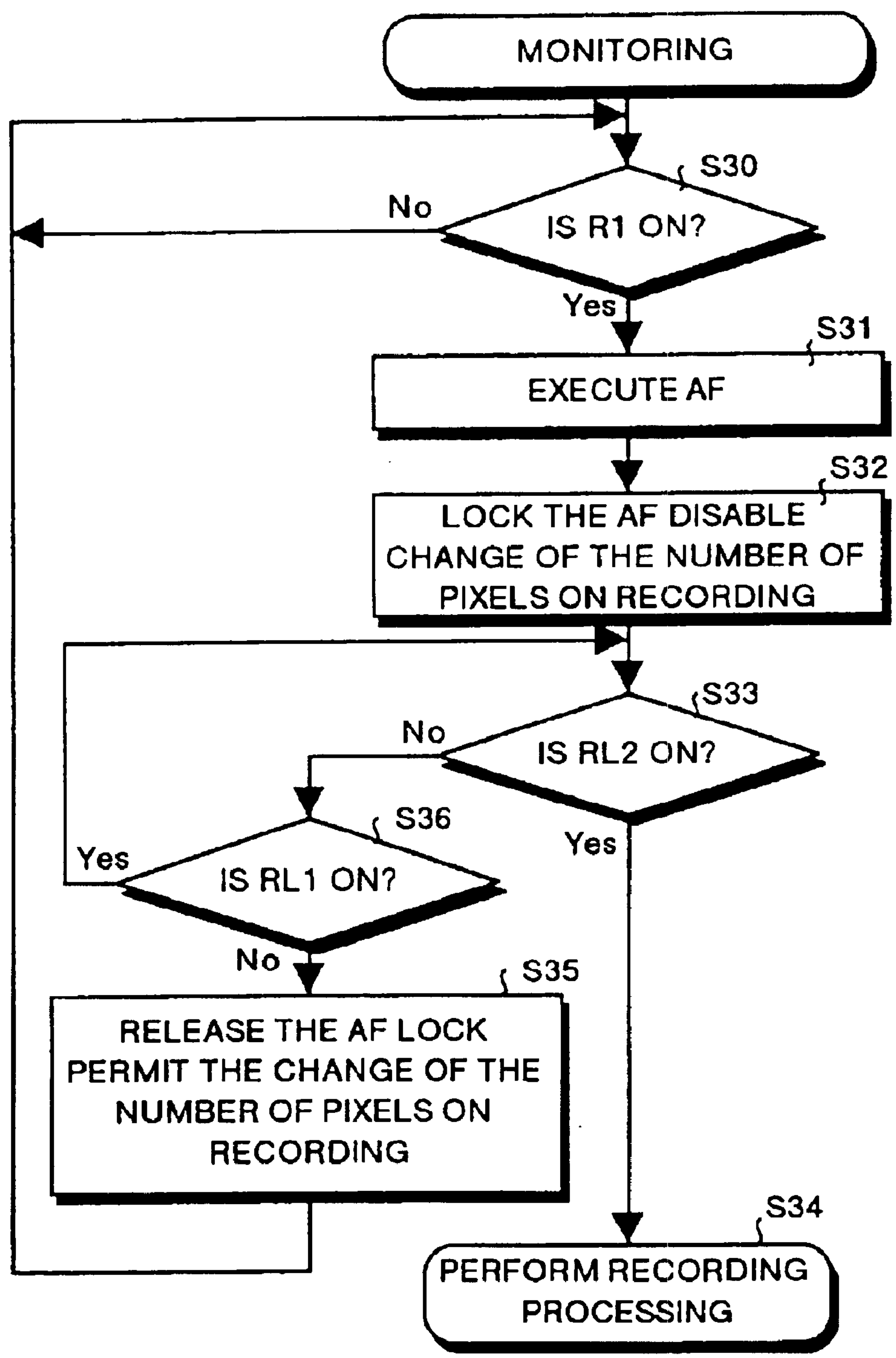
FIG. 13 is a flow chart for explaining processing of the CPU when recording is to be performed after the auto-focusing.

Next description is made for processing of the CPU 121 when recording is to be started after auto-focusing. FIG. 13 concretely explains the processing of the CPU 121 when recording is to be started after auto-focusing.

The CPU 121 follows the following steps. When an image is being monitored, the CPU 121 determines whether RL1 as a release key (RL) has been turned ON or not (step S30). Herein, it is assumed that a state of pressing the release key up to the halfway is "RL1-ON state" and a state of fully pressing down the release key is "RL2-ON state".

When the release key RL is ON, the CPU 121 executes the above mentioned auto-focusing (step S31). Then, the CPU 121 locks the auto-focus (fix the focus position), and disables changing the number of recording pixels in the CCD 103 on recording (step S32). Then, the CPU 121 determines whether the RL2 has been turned ON or not (step S33). When it is determined that the RL2 has been turned ON, the CPU 121 starts recording. On the other hand, when it is determined that the RL2 is not turned ON, the processing is shifted to step S36. In step S36, the CPU 121 determines whether the RL1 has been turned ON or not. When it is determined that the RL1 has been turned ON, the processing is returned to step S33. When it is determined that the RL1 is not turned ON, the CPU 121 releases the auto-focus lock, and permits the change of the number of recording pixels in the CCD 103 on recording (step S35). Then the processing is returned to step S30.

As described above, with the above mentioned example of operation, when auto-focusing is executed, the CPU 112 locks the auto-focus (fixes a focus position) and disables the change of the number of pixels in a CCD 103 to prevent insufficient auto-focusing precision on recording. The reason for disabling a change in the number of pixels in a CCD 103 once the auto-focus is locked is, since each number of pixels in a CCD 103 requires different auto-focusing precision, when a number of recording pixels in a CCD 103 is changed after the auto-focus is locked and if the number is changed to a number of pixels in a CCD 103 requiring higher auto-focusing precision than the auto-focusing precision when the auto-focus is locked, the required auto-focusing precision can not be satisfied.

It should be noted that the present invention is not to be limited to the above mentioned embodiments but is to be construed as embodying all modifications and alternative constructions that may occur to one skilled in the art which fairly fall within the basic teaching herein set forth.

The auto-focus apparatus of the present invention comprises an image pickup device for converting light from an object through a focus lens system to electric signals and outputting the signals as image data; an A/D converting unit for A/D-converting the image data to obtain digital image signals; an AF evaluating unit for outputting an AF evaluated value obtained by integrating high-frequency components of brightness data for the digital image data; a sampling unit for sampling the AF evaluated value obtained by the AF evaluating unit while driving a position of the focus lens system; a recording pixel number setting unit for setting a number of recording pixels of the image pickup device for recording an image; and a focus driving unit for determining a focus according to a result of sampling of the AF evaluated value by the sampling unit and driving the focus lens system to the focus position; wherein amount of shift of the focus lens system for each sampling when sampling the AF evaluated value is changed according to a number of recording pixels set by the recording pixel number setting unit. Thus, the changed amount of shift can be applied to a number of execution times of an auto-focus operation to obtain the auto-focusing precision required by a number of pixels in an image pickup device on recording, so that the time required for the auto-focus operation can be reduced when there is only a small number of pixels in an image pickup device on recording.

The auto-focus apparatus of the present invention comprises an image pickup device for converting light from an object through a focus lens system to electric signals and outputting the signals as image data; an A/D converting unit for A/D-converting the image data to obtain digital image signals; an AF evaluating unit for outputting an AF evaluated value obtained by integrating high-frequency components of brightness data for the digital image data; a sampling unit for sampling the AF evaluated value obtained by the AF evaluating unit while driving a position of the focus lens system; a recording pixel number setting unit for setting a number of recording pixels of the image pickup device for recording an image; and a focus driving unit for determining a focus according to a result of sampling of the AF evaluated value by the sampling unit and driving the focus lens system to the focus position; wherein during a first auto-focus operation, amount of shift of the focus lens system for sampling the AF evaluated value is set to a maximum and a substantial focus position is calculated; and during second auto-focus operation and thereafter, amount of shift of the focus lens system for sampling the AF evaluated value is set at a position closer to the substantial position to a minimum and the final focus position is obtained; and number of times the auto-focus operations are performed is changed according to the number of recording pixels set by the recording pixel number setting unit. Thus, the changed amount of shift can be applied to a number of execution times of an auto-focus operation to obtain the auto-focusing precision required by a number of pixels in an image pickup device on recording, so that the time required for the auto-focus operation can be reduced when there is only a small number of pixels in an image pickup device on recording.

Any of the above mentioned auto-focus apparatus of the present invention further comprises an AF locking unit for holding a focus position after the auto-focus operation is executed; and a disabling unit for disabling, under operation of the AF locking unit, change of a number of recording pixels in the image pickup device for recording an image by the recording pixel number setting unit.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An auto-focus apparatus comprising:

an image pickup means for converting light from an object through a focus lens system to electric signals and outputting the signals as image data;

an A/D converting means for A/D-converting the image data to obtain digital image signals;

an AF evaluating means for outputting an AF evaluated value obtained by integrating high-frequency components of brightness data for the digital image data;

a sampling means for sampling the AF evaluated value obtained by said AF evaluating means while driving a position of said focus lens system;

a recording pixel number setting means for setting a number of recording pixels of said image pickup means for recording an image; and a focus driving means for determining a focus according to a result of sampling of the AF evaluated value by said sampling means and driving said focus lens system to the focus position; wherein amount of shift of said focus lens system for each sampling when sampling the AF evaluated value is changed according to a number of recording pixels set by said recording pixel number setting means.

2. An auto-focus apparatus according to claim 1 further comprising:

an AF locking means for holding a focus position after the auto-focus operation is executed; and a disabling means for disabling, under operation of the AF locking means, change of a number of recording pixels in said image pickup means for recording an image by said recording pixel number setting means.

3. An auto-focus apparatus comprising:

an image pickup means for converting light from an object through a focus lens system to electric signals and outputting the signals as image data;

an A/D converting means for A/D-converting the image data to obtain digital image signals;

an AF evaluating means for outputting an AF evaluated value obtained by integrating high-frequency components of brightness data for the digital image data;

a sampling means for sampling the AF evaluated value obtained by said AF evaluating means while driving a position of said focus lens system;

a recording pixel number setting means for directly setting a number of recording pixels of said image pickup means for recording an image from among a plurality of predetermined numbers of recording pixels; and a focus driving means for determining a focus according to a result of sampling of the AF evaluated value by said sampling means and driving said focus lens system to the focus position; wherein during a first auto-focus operation, amount of shift of said focus lens system for sampling the AF evaluated value is set to a maximum and a substantial focus position is calculated; and during a second auto-focus operation and subsequent auto-focus operations, amount of shift of said focus lens system for sampling the AF evaluated value is decreased and set at a position closer to the substantial focus position and a final focus position is obtained; and thereby a number of times the auto-focus operations are performed is changed according to the number of recording pixels set by said recording pixel number setting means and each auto-focus operation subsequent to said first auto-focus operation has a decreased amount of shift of said focus lens system.

4. An auto-focus apparatus according to claim 3 further comprising:

an AF locking means for holding a focus position after the auto-focus operation is executed; and a disabling means for disabling, under operation of the AF locking means, change of a number of recording pixels in said image pickup means for recording an image by said recording pixel number setting means.

5. An auto-focus apparatus comprising:

an image pickup device which converts light from an object through a focus lens system to electric signals and outputting the signals as image data;

an A/D converter which A/D-converts the image data to obtain digital image signals;

an AF evaluating unit which outputs an AF evaluated value obtained by integrating high-frequency components of brightness data for the digital image data;

a sampling unit which samples the AF evaluated value obtained by said AF evaluating unit while driving a position of said focus lens system;

a recording pixel number setting unit which sets a number of recording pixels of said image pickup device for recording an image; and a focus driving unit which determines a focus according to a result of sampling of the AF evaluated value by said sampling unit and driving said focus lens system to the focus position; wherein amount of shift of said focus lens system for each sampling when sampling the AF evaluated value is changed according to a number of recording pixels set by said recording pixel number setting unit.

6. An auto-focus apparatus according to claim 5 further comprising:

an AF locking unit which holds a focus position after the auto-focus operation is executed; and a disabling unit which disables, under operation of the AF locking unit, change of a number of recording pixels in said image pickup device for recording an image by said recording pixel number setting unit.

7. An auto-focus apparatus comprising:

an image pickup device which converts light from an object through a focus lens system to electric signals and outputting the signals as image data;

an A/D converter which A/D-converts the image data to obtain digital image signals;

an AF evaluating unit which outputs an AF evaluated value obtained by integrating high-frequency components of brightness data for the digital image data;

a sampling unit which samples the AF evaluated value obtained by said AF evaluating unit while driving a position of said focus lens system;

a recording pixel number setting unit which directly sets a number of recording pixels of said image pickup device for recording an image from among a plurality of predetermined numbers of recording pixels; and a focus driving unit which determines a focus according to a result of sampling of the AF evaluated value by said sampling unit and driving said focus lens system to the focus position; wherein during a first auto-focus operation, amount of shift of said focus lens system for sampling the AF evaluated value is set to a maximum and a substantial focus position is calculated; and during a second auto-focus operation and subsequent auto-focus operations, amount of shift of said focus lens system for sampling the AF evaluated value is decreased and set at a position closer to the substantial focus position and a final focus position is obtained; and thereby a number of times the auto-focus operations are performed is changed according to the number of recording pixels set by said recording pixel number setting unit and each auto-focus operation subsequent to said first auto-focus operation has a decreased amount of shift of said focus lens system.

8. An auto-focus apparatus according to claim 7 further comprising:

an AF locking unit which holds a focus position after the auto-focus operation is executed; and a disabling unit which disables, under operation of the AF locking unit, change of a number of recording pixels in said image pickup device for recording an image by said recording pixel number setting unit.

9. A control method for auto-focus apparatus comprising the steps of:

converting light from an object through a focus lens system to electric signals and outputting the signals as image data by an image pickup device;

A/D-converting the image data to obtain digital image signals;

outputting an AF evaluated value obtained by integrating high-frequency components of brightness data for the digital image data;

sampling the AF evaluated value obtained by said AF evaluating step while driving a position of said focus lens system;

setting a number of recording pixels of said image pickup device for recording an image; and determining a focus according to a result of sampling of the AF evaluated value by said sampling step and driving said focus lens system to the focus position; wherein amount of shift of said focus lens system for each sampling when sampling the AF evaluated value is changed according to a number of recording pixels set by said recording pixel number setting step.

10. A control method for auto-focus apparatus according to claim 9 further comprising the steps of:

holding a focus position after the auto-focus operation is executed; and disabling, under operation of said holding step, change of a number of recording pixels in said image pickup device for recording an image by said recording pixel number setting step.

11. A control method for-auto-focus apparatus comprising:

converting light from an object through a focus lens system to electric signals and outputting the signals as image data by an image pickup device A/D-converting the image data to obtain digital image signals;

outputting an AF evaluated value obtained by integrating high-frequency components of brightness data for the digital image data;

sampling the AF evaluated value obtained by said AF evaluating step while driving a position of said focus lens system;

directly setting a number of recording pixels of said image pickup device for recording an image from among a plurality of predetermined numbers of recording pixels; and determining a focus according to a result of sampling of the AF evaluated value by said sampling step and driving said focus lens system to the focus position; wherein during a first auto-focus operation, amount of shift of said focus lens system for sampling the AF evaluated value is set to a maximum and a substantial focus position is calculated; and during a second auto-focus operation and subsequent auto-focus operations, amount of shift of said focus lens system for sampling the AF evaluated value is decreased and set at a position closer to the substantial focus position and a final focus position is obtained; and thereby a number of times the auto-focus operations are performed is changed according to the number of recording pixels set by said recording pixel number setting step and each auto-focus operation subsequent to said first auto-focus operation has a decreased amount of shift of said focus lens system.

12. A control method for auto-focus apparatus according to claim 11 further comprising the steps of:

holding a focus position after the auto-focus operation is executed; and disabling, under operation of said holding step, change of a number of recording pixels in said image pickup device for recording an image by said recording pixel number setting step.

* * * * *